May 10, 1927.
M. CLODFELTER
1,627,552
MOTOR OPERATED SAW
Filed April 9, 1925
3 Sheets-Sheet 3
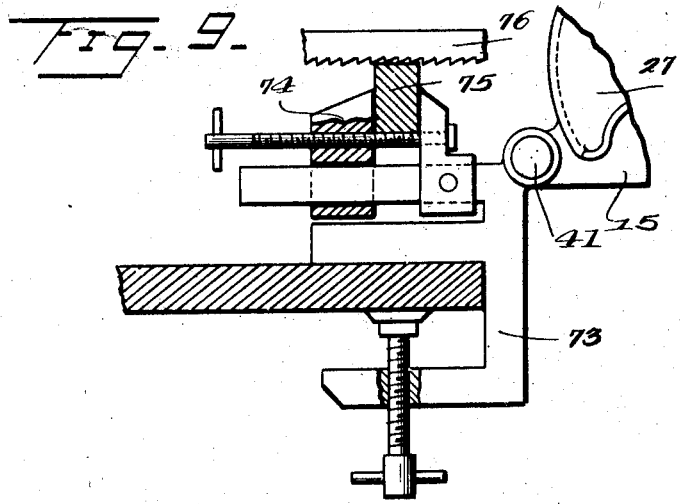
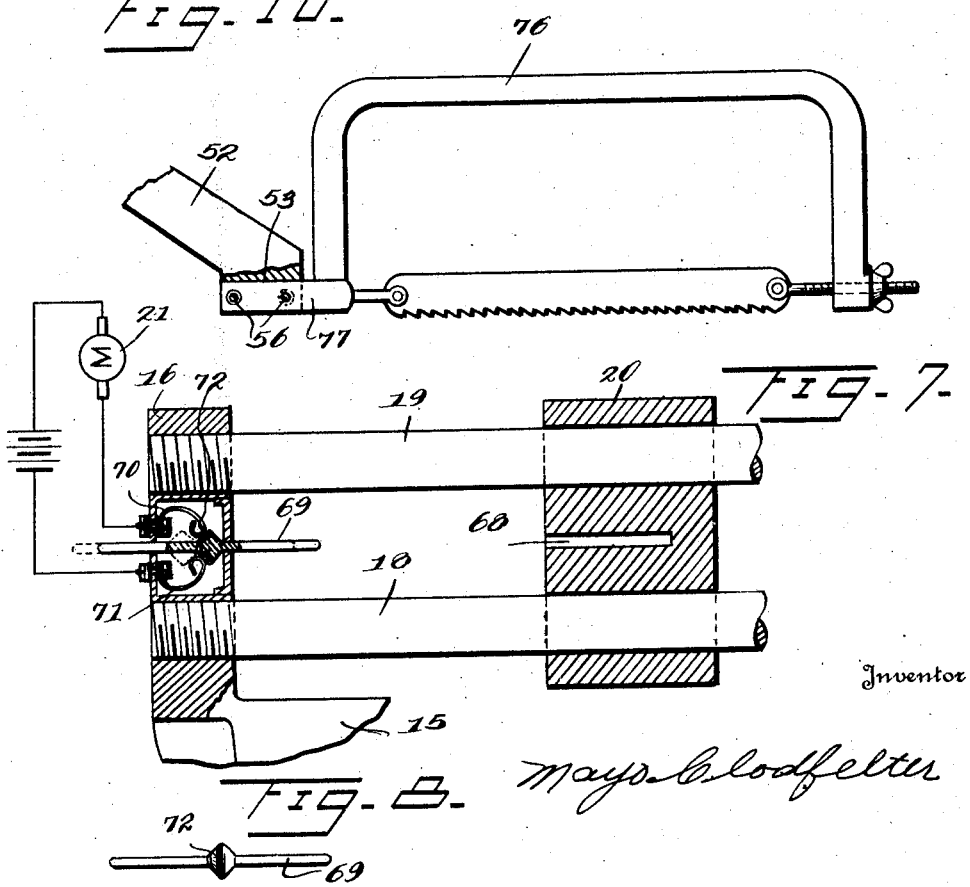
Inventor
Mayo Clodfelter Patented May 10, 1927.

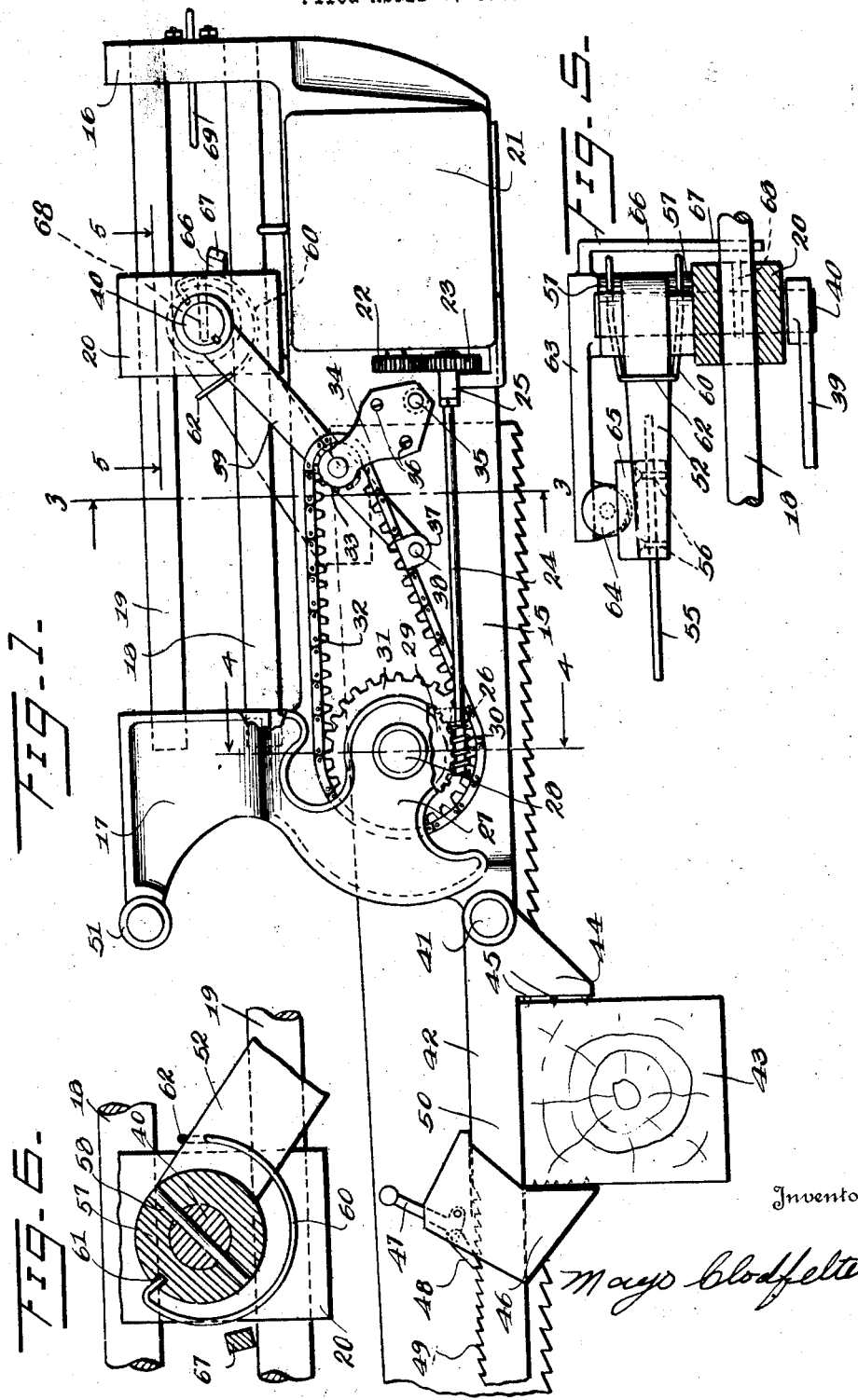

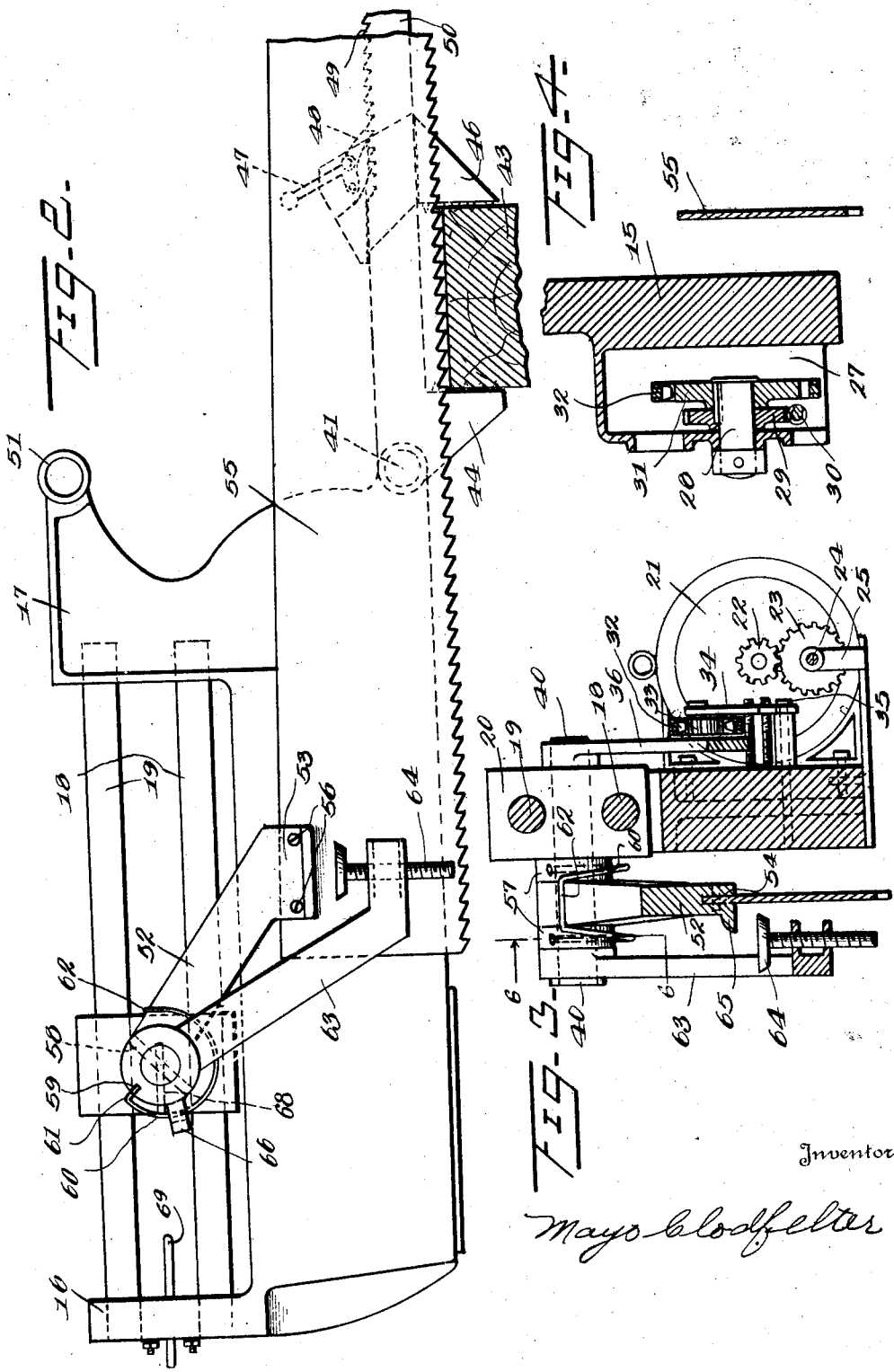

1,627,552

UNITED STATES PATENT OFFICE.

MAYO CLODFELTER, OF DETROIT, MICHIGAN.

MOTOR-OPERATED SAW.

Application filed April 9, 1925. Serial No. 21,837.

The present invention relates to a portable motor operated saw, and aims to provide a novel and improved device of this character which may be conveniently clamped to material to be sawed thereby for efficiently supporting the device in an operative position.

Another object of the invention is the provision of a motor operated saw which may be supported in either a horizontal or vertical position, said device having spring means for applying a pressure to the saw blade for holding the same in contact with the material to be sawed.

A further object of the invention is to provide means for breaking the circuit to the motor for stopping the same after the material has been cut, said means for breaking the circuit also serving the purpose of supporting the saw blade against further downward movement after the sawing of the material, said device being so constructed that either a wood or metal saw may be used in connection therewith.

A still further object of the invention is the provision of a supporting member carrying a motor driven sprocket gear and an adjustable sprocket gear over which a chain travels, said chain having connection with a slidable cross head that carries the saw blade for reciprocating said saw blade in order to cut material, the stroke of said saw blade being governed by the length of the chain and the distance the cross head is permitted to slide.

It is also an object of the invention to provide a motor operated saw of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed without departing from the spirit of the invention.

The invention is illustrated in the accompanying drawings, wherein:

Figure 1 is a side elevation of my improved device, showing the same clamped to material to be sawed thereby, Figure 2 is also a side elevation, showing the opposite side thereof, Figure 3 is a cross section taken on line 3—3 of Figure 1, Figure 4 is a fragmentary cross section taken on line 4—4 of Figure 1, Figure 5 is a fragmentary horizontal section on line 5—5 of Figure 1, Figure 6 is a detail section taken on line 6—6 of Figure 3, Figure 7 is a fragmentary longitudinal section showing the circuit maker and breaker, Figure 8 is a detail elevation of the movable member of the circuit maker and breaker, Figure 9 is a fragmentary longitudinal section showing the manner of supporting my device when sawing metal, and Figure 10 is an elevation of a metal saw showing the manner of connecting the same to my improved device.

In carrying out the invention the numeral 15 designates an elongated body having a pair of uprights rigidly carried thereby, one being arranged at one end and designated by the numeral 16, while the other is arranged at the opposite end and designated by the numeral 17. Rigidly carried by the uprights 16 and 17 are a pair of spaced parallel bars 18 and 19, for slidably supporting a cross head 20 through which said bars 18 and 19 extend. Upon one end of the elongated body 15 is mounted an electric motor 21 having a small driving pinion 22 mounted on the drive shaft thereof for meshing with a larger gear or pinion 23 arranged upon one end of a rotatable shaft 24 also mounted upon said body in bearings, as indicated by the numerals 25 and 26.

At the end of the body 15 where the upright 17 is arranged is provided an offset bracket 27 which receives and rotatably supports a shaft 28. Mounted on the shaft 28 adjacent the bracket 27 is a worm gear 29 that meshes with a worm 30 carried by the opposite end of the rotatable shaft 24 from that carrying the gear 23, for rotating said shaft 28. Also mounted on the shaft 28 is a large sprocket gear 31 which has a continuous chain 32 arranged thereabout for travelling thereover, while spaced from the gear 31 is a smaller gear 33 which said chain also travels about. The gear 33 is carried by a bracket 34 adjustably connected to the body 15 by the provision of a pin 35 upon which said bracket may turn and a pair of locking screws 36 which are threaded through said bracket and abut against the sides of the body 15. By the provision of this adjustable feature the chain may be held tight by simply turning said bracket on its pivot. The chain 32 has one link thereof provided with a lug 37 which is pivotally connected by a pin 38 to one end of a crank arm 39, the opposite end of which is attached to a cross pin 40 extending through the cross head 20. From the foregoing, it is obvious that the turning of the chain will cause the cross head 20 to be reciprocated on the bars 18 and 19.

Detachably connected to the body 15, as at 41, is a clamping member 42 which is arranged for engaging the material to be sawed, such material being indicated by the numeral 43. The clamping member 42 consists of a stationary jaw 44 having a series of small prongs 45 arranged on the face thereof for engaging into the material 43 and an adjustable jaw 46 having a like face for engaging the material. The adjustable jaw 46 has pivotally connected thereto a lever 47 carrying a pawl 48 which is adapted to engage in teeth 49 provided upon the portion 50 of the clamp on which the adjustable jaw 46 is slidably supported. It will be noted that the pivot of the lever 47 and the pivot of the pawl to said lever are arranged so that said lever may be swung to a position in order to hold said pawl between the desired teeth 49 in the portion 50 of the clamp.

Arranged on the upright 17 above the detachable connection 41 of the body 15 with the clamp 42 is provided an eye 51 that may be connected at the point 41 to the clamp in order to support the body 15 in a vertical plane, the detail construction of the connection being of any well known type for rigidly attaching the body to the clamp.

Upon the end of the pin 40 opposite to that where the crank arm is attached is mounted an arm 52 for turning movement. The arm 52 extends downwardly in an inclined direction and has the lower end 53 thereof provided with a slot 54 for receiving the upper edge of one end of a saw blade 55, said saw blade being secured to said arm by passing a pair of screws 56 or the like through said arm and saw blade. Positioned on the shaft 40 on the opposite sides of the arm 52 are a pair of collars 57 that are secured to said pin 40 by passing small pins 58 through the collars and pin 40. In each of the collars 57 are provided small openings 59 into which engage the opposite ends of a spring member 60, as at 61, the intermediate portion of said spring member 60 engaging over the arm 52, as at 62, in order to transmit a downward pressure on the arm 52 for holding the saw blade 55 in engagement or contact with the material 43 to be cut. By referring to Figure 2, it will be noted that as the saw blade cuts through the material 43, the spring member 60 will continue to urge the blade 55 downwardly throughout the reciprocation of said blade.

Upon the outer extreme end of the pin 40 that supports the arm 52 is mounted another downwardly extending inclined arm 63 which carries an adjustable screw 64 at its lower end, the head of which is arranged to be engaged by a lug 65 carried by the lower end of the arm 52 when the saw blade is moved downwardly to a position where the same has completely cut the material to be sawed. Upon the upper end of the arm 63 is rigidly carried an L-shaped extension or lever 66 which has the portion 67 thereof extending between the bars 18 and 19 at the rear end of the slidable head 20. The head 20 has an opening or small bore 68 therein, as illustrated in Figure 8 of the drawing, which receives one end of a slidably mounted pin 69 carried by the upright 16 when the cross head is at its extreme rearward stroke. It will be noted that when the arm 63 is moved downwardly by the lug 65 on the arm 52 engaging therewith that the portion 67 of the L-shaped extension 66 moves in a position to prevent the pin 69 being received in the bore 68 at the extreme rearward stroke, thus causing the slidable pin 69 to be moved rearwardly through the upright 16.

Arranged in the upright 16 between the ends of the bars 18 and 19 are a pair of electric contacts 70 and 71 which normally engage a tapered face 72 provided on the pin 69 for completing an electric circuit to the motor 21. However, when the pin 69 is slid rearwardly by contacting with the member 67 the circuit to the motor is broken, as the pin is constructed of insulation material with the exception of the tapered portion 72 which has been moved out of engagement with the spring contacts 70 and 71, thus stopping the motor which will cause the operation of the device to cease after the sawing of the material 43 is completed.

In Figures 9 and 10 of the drawings is illustrated the form of my invention used for sawing metal. In this form a different type of clamping member is attached to the body 15, which consists of a bench clamp 73 and vice structure 74, said bench clamp being adapted to be secured to any member for supporting the device, while the vice structure supports the metal to be sawed, as indicated by the numeral 75. In this form the saw blade 55 is disconnected from the arm 52 and a hack saw 76 having a rearwardly extending portion 77 is attached to the arm 52 in place thereof.

In operation of the form of my invention illustrated in Figures 1 to 8 inclusive, the adjustable jaw 46 of the clamp 42 is moved so that the same and the stationary jaw 44 will be rigidly secured to the material to be sawed. The slidable pin 69 is then slid forwardly in the upright 16 to complete a circuit to the electric motor 21, which through the gears 22 and 23 will rotate the shaft 24, which in turn rotates the large sprocket gear 31 for driving the chain 32. As the chain 32 is moved the crank arm 39 attached thereto will slide the cross head 20 back and forward on the bars 18 and 19, which will cause a reciprocating motion to be imparted to the saw blade 55, the spring 60 serving the purpose of holding the blade 55 in contact with the material to be cut. After the material has been entirely cut the saw blade 55 is permitted to move in a downward direction until the same engages the adjustable screw 64 carried by the arm 63, which will swing the arm 63 to a position to move the L-shaped member 66 in alignment with the slidably mounted pin 69, thus causing said pin to be moved rearwardly when the saw blade moves to its next rearward stroke, which will break the circuit to the motor, thus bringing the device to a stop. The arm 63 is frictionally carried by the pin 40 so that the same will remain in the same position until engaged by the arm 52.

The operation of the form of my invention shown in Figures 9 and 10 is identical with the other form with the exception that the device is not supported by the material to be cut, said material being received in the vice structure 74.

Having thus described my invention, what I claim as new is:

1. A motor operated saw comprising a body, a motor carried by said body, a cross head slidably mounted on said body, means connecting said cross head to said motor for reciprocating said cross head upon operation of the motor, a shaft extending from one side of said cross head, a saw blade pivotally carried by said shaft, an electric switch carried by said body and in circuit with said electric motor, and an arm pivotally carried by said shaft and adapted to be engaged by said saw blade after the same has completed its cut for moving a portion of said arm to a position to engage said electric switch for breaking the circuit to said motor.

2. A motor operated saw comprising a body, a motor carried by said body, a cross head slidably mounted upon said body, means connecting said cross head to said motor for reciprocating said cross head upon operation of said motor, a shaft carried by said cross head, an arm pivotally connected to said shaft, a saw blade carried by said arm, spring means engaging said arm for normally urging said saw blade in a downward direction in engagement with the material to be sawed, another arm carried by said shaft and adapted to be engaged by said first mentioned arm for swinging the same on said shaft, an electric switch carried by said body and in circuit with said motor, and means carried by said second mentioned arm adapted to be arranged in a position for engaging said electric switch when said arm has been moved by the first mentioned arm carrying said saw blade for operating said electric switch to break the circuit to the motor.

3. A motor operated saw comprising a body, a crosshead slidably mounted upon said body, a motor carried by said body, means connecting said cross head to said motor for reciprocating said crosshead upon the operation of the motor, an arm pivotally connected to said crosshead, a saw blade carried by said arm, another arm pivotally carried by said crosshead, and adjusting screw carried by said second mentioned arm and adapted to lie in the path of movement of said first mentioned arm so that said second mentioned arm will be moved by said first mentioned arm, an extension arranged upon said second mentioned arm, an electric switch carried by said body and adapted to be engaged by the extension on said second mentioned arm when said second mentioned arm has been moved by said first mentioned arm and the crosshead moved towards said switch, said switch being connected to said electric motor for breaking the circuit thereto.

In testimony whereof, I have affixed my signature.

MAYO CLODFELTER.